United States Patent

Weinberg et al.

[11] Patent Number: 5,813,560
[45] Date of Patent: Sep. 29, 1998

[54] GAS CAP WITH BREAK-AWAY PORTION

[76] Inventors: David Weinberg, 5000 Oakes Rd., Suite H, Fort Lauderdale, Fla. 33304; John Herzberg, 5205 Alton Rd., Miami Beach, Fla. 33140

[21] Appl. No.: 837,872

[22] Filed: Apr. 25, 1997

[51] Int. Cl.$^6$ ........................................ B65D 41/02
[52] U.S. Cl. .................. 220/266; 220/288; 220/797; 220/DIG. 33
[58] Field of Search ............... 220/288, DIG. 33, 220/254, 255, 215, 265, 266, 780, 783, 796, 797; 215/320, 364, 354, 250, 253

[56] References Cited

U.S. PATENT DOCUMENTS

D. 353,357  12/1994  Weinberg et al. .
4,231,240  11/1980  Fujita et al. ................. 220/288 X Primary Examiner—Allan N. Shoap
Assistant Examiner—Robin A. Hylton
Attorney, Agent, or Firm—Oltman, Flynn & Kubler

[57] ABSTRACT

A method of seal locking together a preformed plastic molded top lid portion of a gas filler cap to a preformed plastic molded threaded base portion of a gas filler cap. The preformed top lid portion of the gas cap is locked to a stationary preformed threaded base portion of a gas filler cap by spin welding a lower extending tab of the top lid portion into a mating channel in the base portion together. The tab can be a circular rectangular tab having a step down inner edge and an indentation cutout on the lower surface of the lid portion between the tab and an exterior side wall of the lid portion, wherein the indentation cut-out provides a sacrificial break point upon impact and allows the exterior side wall of the top lid portion to break-off without breaking the locking seal between the tab and the channel for reasons of safety upon impact. The channel can be a circular with an angled inner wall. The spin welding causes plastic material on the tab and channel that abuts together to heat, melt and sealingly fuse the tab and channel together.

8 Claims, 2 Drawing Sheets

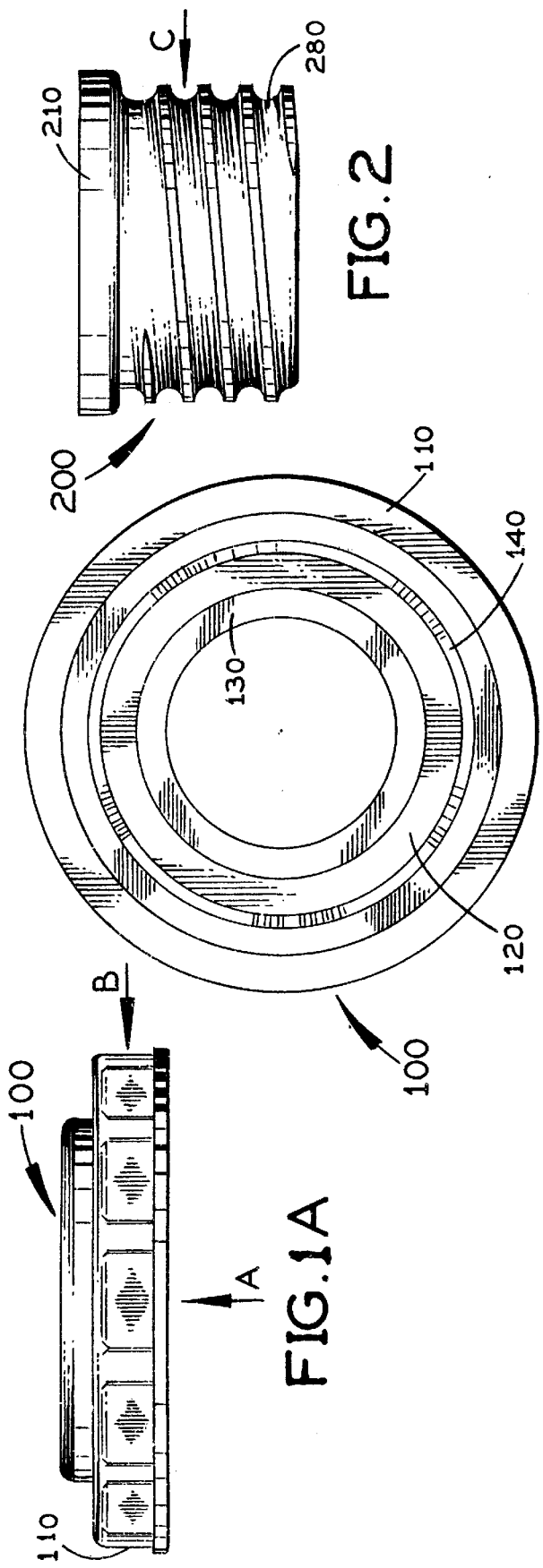

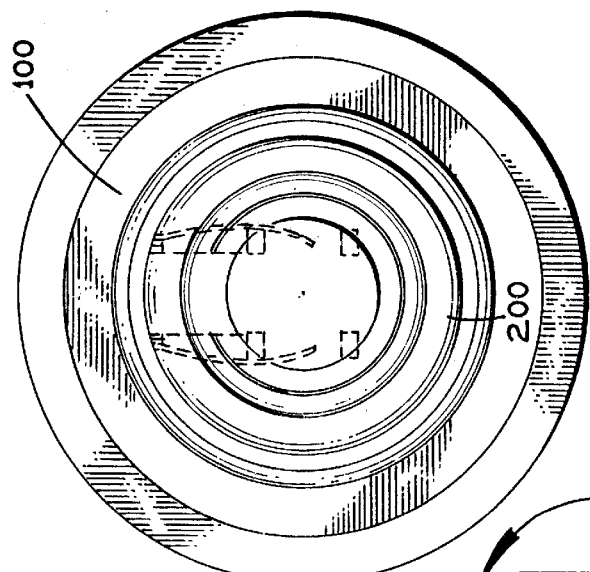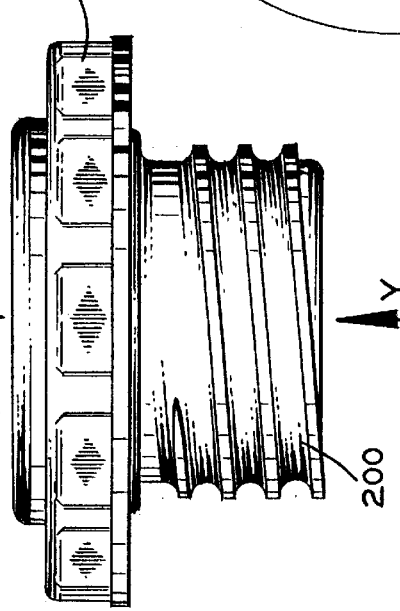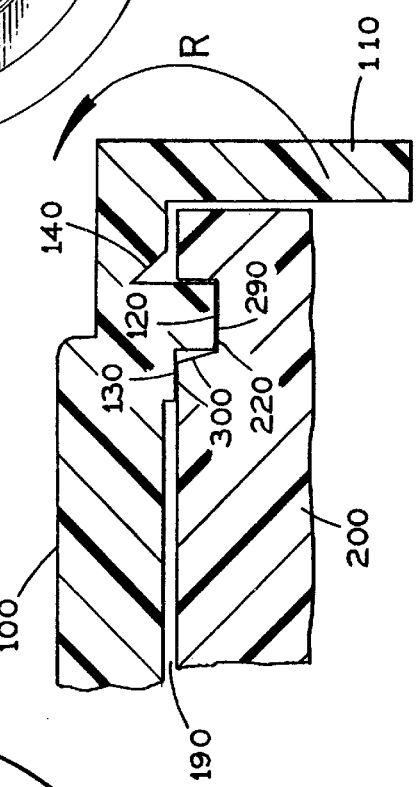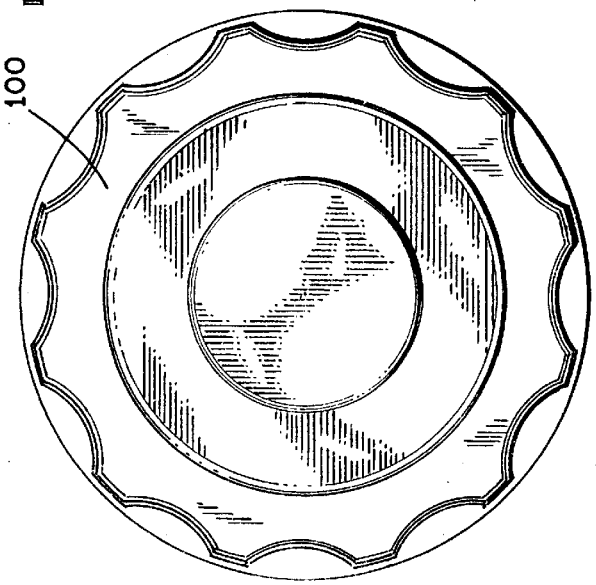

GAS CAP WITH BREAK-AWAY PORTION

BACKGROUND AND PRIOR ART

Gas caps especially spring loaded gas filler caps such as the one shown in U.S. Des. 353,357 to Weinberg et al. are generally formed of several separate premolded plastic pieces. For example, most gas caps include a disc shaped top cap portion with external raised ridge edges and a cylindrical base portion having external threads that mateably thread to the threaded nozzle portion on a vehicle gas tank. Because the base portion and top cap portion are connected by being snap fitted together, the fitting between these pieces may have air gaps that can allow both gas fumes and actual gas spillage to occur when the gas cap has been attached to the nozzle opening to the vehicle gas tank. Furthermore, the snap fitting between these separate portions may break and separate the portions from one another possibly leaving the threaded base portion stuck within the gas tank nozzle opening. For example, the side walls of the lid portion of the gas filler caps may break off from abuse. Thus, the need exists for an improved gas cap over the prior art.

SUMMARY OF THE INVENTION

The first objective of the present invention is to provide a gas filler cap that is initially formed from a premolded threaded base portion and a top lid portion that become fused to one another in manufacturing.

The second object of this invention is to provide a gas filler cap formed of separate premolded portions that when attached to one another prevents gas fumes and leaks from escaping from their connection points.

The third object of this invention is to provide a gas filler cap having a threaded base portion locked to a top lid portion by spin heat welding the portions to one another.

A method of seal locking together a preformed plastic molded top lid portion of a gas filler cap to a preformed plastic molded threaded base portion of a gas filler cap wherein a preformed top lid portion of a gas filler cap is locked to a stationary preformed threaded base portion of a gas filler cap by spin welding a lower extending tab of the top lid portion into a mating channel in the base portion together. The tab can be a circular rectangular tab having a step down inner edge and an indentation cutout on the lower surface of the lid portion between the tab and an exterior side wall. The indentation cut-out is intended to allow the exterior side wall of the top lid portion to act as a sacrificial break-off upon impact and save the locking seal for reasons of safety upon impact. The channel can be a circular channel having an angled inner wall. The spin welding causes plastic material on the tab and channel that abuts one another to heat, melt and sealingly fuse the tab and channel together.

Further objects and advantages of this invention will be apparent from the following detailed description of a presently preferred embodiment which is illustrated schematically in the accompanying drawings.

BRIEF DESCRIPTION OF THE FIGURES

FIG. 1A is a side view of a top cap portion of the gas filler cap of the subject invention.

FIG. 1B is a bottom view of the top cap portion of FIG. 1A along arrow A.

FIG. 2 is a side view of the threaded base portion of the gas filler cap of the subject invention.

FIG. 3 is an enlarged cross-sectional view of the top cap portion of FIG. 1A along arrow B.

FIG. 4 is an enlarged cross-sectional view of the threaded base portion of FIG. 2 along arrow C.

FIG. 5 shows abuting the top cap portion of FIG. 3 to the base portion of FIG. 4.

FIG. 6A is a perspective view of the assembled gas filler cap of FIGS. 1–5.

FIG. 6B is a top view of the gas filler cap of FIG. 6A along arrow X.

FIG. 6C is a bottom view of the gas filler cap of FIG. 6A along arrow Y.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1A is a side view of a top lid portion 100 of the gas filler cap of the subject invention.

FIG. 1B is a bottom view of the top lid portion 100 of FIG. 1A along arrow A. FIG. 3 is an enlarged cross-sectional view of the top lid portion 100 of FIG. 1A along arrow B. Referring to FIGS. 1A, 1B and 3, top lid portion 100 includes an exterior side wall 110 having raised ridges that allows a user to grip thereon when twisting the gas cap on and off a gas tank nozzle. Top lid portion 100 includes a lower extending circular tab 120 having rectangular edges, and an inner step ledge 130 and an indentation approximately 45 degree angled cutout 140 on the lower surface of the lid portion 100 between the tab 120 and the exterior side wall 110.

FIG. 2 is a side view of the threaded base portion 200 of the gas filler cap of the subject invention. FIG. 4 is an enlarged cross-sectional view of the threaded base portion 200 of FIG. 2 along arrow C. Referring to FIGS. 2 and 4, threaded base portion 200 includes a circular generally rectangular channel 220 in an upper surface 215 having an approximately sloping 15 degree angled inner wall 225.

FIG. 5 shows abuting tab 120 of the top lid portion 100 of FIG. 3 to the channel 220 of the base portion 200 of FIG. 4. Step-up ledge 130 causes air spaces 190, 290 to be between top lid portion 100 and base portion 200. Spin welding by rotating the top lid portion in the direction of arrow R above a stationary base portion 20 causes plastic material 300 on the tab and channel that abuts together to frictionally heat, melt and sealingly fuse the tab 120 and channel 220 together. The seal between the tab and channel prevents fumes and gas spillage and maintains pressure. The indentation cut-out 140 allows the side wall 10 of the top lid portion 100 to break-off and save the locking seal when and if the side wall 110 begins to separate from the rest of the top lid portion 100 during normal use of the gas filler cap. The channel can be a circular with an angled inner wall.

FIG. 6A is a perspective view of the assembled gas filler cap 500 that includes the top lid portion 100 assembled and sealed to the threaded base portion 200 of FIGS. 1–5. FIG. 6B is a top view of the gas filler cap 500 of FIG. 6A along arrow X. FIG. 6C is a bottom view of the gas filler cap 500 of FIG. 6A along arrow Y.

While the invention has been described, disclosed, illustrated and shown in various terms of certain embodiments or modifications which it has presumed in practice, the scope of the invention is not intended to be, nor should it be we claim:

1. A gas filler cap having a premolded threaded base portion that is sealingly locked to a top lid portion, comprising:

a premolded top lid portion having a tab extending beneath a lower surface;

a premolded threaded base portion having a groove on an upper surface for mateably receiving the tab of the top lid portion;

a seal means between the tab and the groove for preventing gas fumes and fuel from leaking out therebetween;

the tab comprising an annular tab;

the lid including a step down inner edge radially inwardly of said annular tab; and an indentation cutout on the lower surface of the lid portion between the tab and an exterior side wall of the lid portion, wherein the indentation cut-out provides a sacrificial breaking point upon impact and allows the exterior side wall of the top lid portion to break-off without breaking the seal means for reasons of safety upon impact.

2. The gas filler cap of claim 1, wherein the top lid portion and the threaded base portion are each formed from:

injection molded plastic.

3. The gas filler cap of claim 1, wherein the seal means includes:

a heat melted seal formed between the tab and the groove locking the tab and groove together.

4. The gas filler cap of claim 3, wherein the heat melted seal is formed from:

spin welding.

5. The gas filler cap of claim 3, wherein the groove includes:

an annular channel.

6. The gas filler cap of claim 5, wherein the annular channel includes:

an angled inner wall.

7. A gas filler cap having a premolded threaded base portion that is sealingly locked to a top lid portion, comprising:

a premolded plastic top lid portion having an annular tab extending beneath a lower surface;

a premolded plastic threaded base portion having an annular channel on an upper surface for mateably receiving the annular tab of the top lid portion;

a heat melted seal means formed by spin welding the tab to the channel that prevents gas fumes and fuel from leaking out therebetween; the lid including:

a step down inner edge radially inwardly of said annual tab; and an indentation cutout on the lower surface of the lid portion between the tab and an exterior side wall of the top lid portion, wherein the indentation cut-out allows an exterior side wall of the top lid portion to break-off without breaking the seal means between the tab and the channel.

8. The gas filler cap of claim 7 wherein the annular channel includes:

an angled inner wall.

* * * * *